April 8, 1958 L. C. STENNING 2,830,179
ELECTRIC PULSE GENERATORS
Filed Jan. 15, 1954

INVENTOR
Luis Charles Stenning
BY
ATTORNEY

United States Patent Office 2,830,179

Patented Apr. 8, 1958

2,830,179

ELECTRIC PULSE GENERATORS

Luis Charles Stenning, Beaconsfield, England, assignor to The General Electric Company Limited, London, England Application January 15, 1954, Serial No. 404,354

Claims priority, application Great Britain January 27, 1953

1 Claim. (Cl. 250—27)

Figure 1:
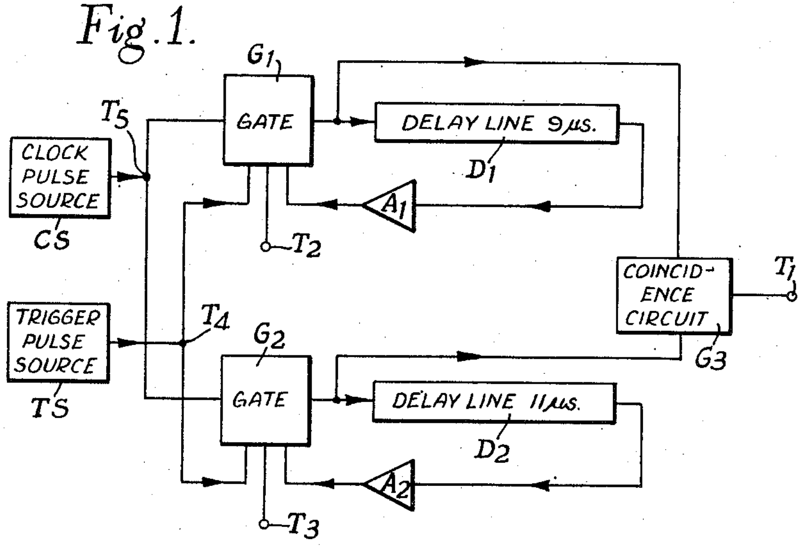

The present invention relates to electric pulse generators.

For some purposes it is required to generate a train of recurrent pulses having a predetermined recurrence frequency and a phase determined by the time of occurrence of a trigger pulse.

This requirement may arise for example in an automatic telephone exchange of the so-called electronic type.

A known circuit for generating a train of pulses of the character referred to operates as follows: There is provided a source of clock pulses having a recurrence frequency which is a suitable integral multiple of the frequency of the train to be generated. These clock pulses are applied to a gate circuit and the gate is arranged to be opened by the trigger pulse, thus allowing to pass through the gate the clock pulse which occurs at the time of occurrence of the trigger pulse. This clock pulse, appearing at the output of the gate circuit, is fed to the input of a delay line which delays the pulse by a time equal to the recurrence period of the pulses in the train to be generated. The delayed pulse is suitably amplified and fed to the gate circuit to open the gate to the passage of the clock pulse which occurs at the time of occurrence of the delayed clock pulse. This process may continue indefinitely after having been initiated by a single trigger pulse. The desired train of pulses may thus be obtained from, for example, the output of the gate circuit. The combination of the gate circuit, delay line, and amplifier constitutes a pulse selecting circuit serving to select from the clock pulses a train having the required recurrence frequency and phase.

It may be noted that the delayed pulse will be distorted but such distortion can be arranged to have no effect upon the shape of the output pulses since the distorted delayed pulses are used only to open the gate and the output pulses can therefore have substantially the same shape as the clock pulses. "Clearing," that is to say stopping the generation of the train of pulses, may be effected by paralysing the action of the gate circuit to keep the gate closed in spite of the application of delayed pulses thereto. For this purpose a clearing pulse may be applied to the gate circuit and this pulse must have a duration approximately equal to the recurrence period of the pulses in the output train in order that the same clearing pulse may be used whatever the phase of the selected output pulses.

Where the recurrence period of the desired train is relatively high, for instance about 100 microseconds, the delay line, which must have a delay time of the same value, is cumbersome and expensive, whatever form it may take. Moreover the clearing pulse has to have a correspondingly long duration.

It is the object of the present invention to provide means for obtaining the results obtainable with the known circuit referred to, with the use of a more compact and less expensive apparatus.

According to the present invention there is provided apparatus for generating a train of recurrent pulses having a predetermined recurrence frequency and a phase determined by the time of occurrence of a trigger pulse, such apparatus comprising a source of clock pulses of recurrence frequency which is an integral multiple of the said predetermined recurrence frequency, a plurality of pulse selecting circuits each including a gate circuit having its output connected to the input of a delay line, and means for applying suitably amplified delayed pulses from the delay line to open the gate, connections for applying the said clock pulses to all the gate circuits in such a manner that the clock pulses pass to the respective outputs of the gate circuits only when the respective gates are open, and means for applying the said trigger pulse to open all the said gates simultaneously, wherein the delays introduced by the delay lines are proportional to numbers which are in prime relation to one another (that is to say the numbers have no common factor) and wherein the outputs of the gate circuits are coupled to a coincidence circuit at whose output the desired train is generated, pulses occurring in such output only when the pulses applied to the coincidence circuit from all the gate circuits occur simultaneously.

The term "delay line" is intended to be read widely as covering any device by which a delay can be produced in the time of occurrence of a pulse applied thereto.

Figure 2:
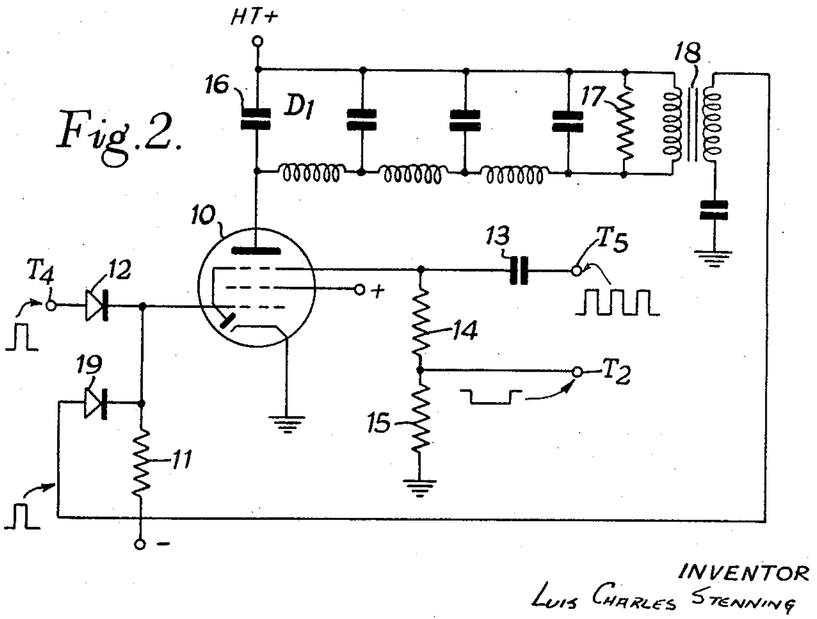

The invention will be described, by way of example, with reference to the accompanying drawing in which Fig. 1 is a block circuit diagram of one embodiment of the invention, and Fig. 2 is a diagram of one form of pulse selecting circuit that may be used in Fig. 1.

Referring to Fig. 1, there are provided two pulse selecting circuits which are like excepting for the delay time of their delay lines. Each comprises a gate circuit $G_1$ or $G_2$ having its output coupled to the input of the delay line $D_1$ or $D_2$. The output of the delay line is coupled through an amplifier $A_1$ or $A_2$ to the gate circuit $G_1$ or $G_2$ and a trigger pulse is applied from a common source TS simultaneously to the two gate circuits. Clock pulses from a common source CS are applied simultaneously to the two gate circuits and a clock pulse is passed through each gate only when either a trigger pulse or a delayed pulse is applied to the gate circuit at the same time as a clock pulse is applied thereto. The outputs of the two gate circuits are coupled to a coincidence or gate circuit $G_3$ so constituted that an output is produced therefrom at $T_1$ only when pulses from the two gate circuits $G_1$ and $G_2$ are applied simultaneously to the coincidence circuit.

In the example illustrated the delays introduced by the two delay lines are of 9 and 11 microseconds and the pulse recurrence period of the clock pulses is 1 microsecond. Consequently a clock pulse will be passed through the gate $G_1$ every 9 microseconds and through the gate $G_2$ every 11 microseconds. Pulses will occur at the same time at the coincidence circuit every 99 microseconds and consequently the desired output train at $T_1$ will have a recurrence period of 99 microseconds and the phase of the output pulses will be determined by the time of occurrence of the trigger pulse.

Clearing may be effected by applying to the two gates at terminals $T_2$ and $T_3$ a pulse which holds the gates closed, but in this case the duration of the clearing pulse need only be 11 microseconds.

The total delay time which must be produced by the two delay lines is in this case only 20 microseconds instead of 99 microseconds which would be needed with the known apparatus referred to. The amplifiers may be combined with the gate circuits.

A pulse selecting circuit of Fig. 1, comprising parts $G_1$, $D_1$ and $A_1$, in one example are constituted as shown in Fig. 2. A pentode-diode valve 10 (for example the type 6F33) has its control grid biased negatively through a grid resistor 11 and its cathode earthed. The trigger pulses are applied at a terminal $T_4$ (corresponding to that with the same reference in Fig. 1) through a rectifier 12 to the control grid in a positive-going sense. Clock pulses are applied in a positive-going sense at a terminal $T_5$ (corresponding to that with the same reference in Fig. 1) through a capacitor 13 to the suppressor grid which is connected to the anode of the diode. The suppressor grid is connected to earth through two resistors 14 and 15 in series and negative-going clearing pulses are applied, when required, to the junction of these two resistors through terminal $T_2$. The main anode is connected through a capacitor 16 to the positive terminal HT+ of a source of anode current, the negative terminal of which is earthed. This capacitor 16 constitutes the input impedance element of a multi-section delay line $D_1$ comprising series inductors and shunt capacitors, the line being terminated in a suitable resistor 17. The voltages generated across this resistor are applied through a transformer 18, arranged to invert the sense of the pulses, and through a rectifier 19 to the control grid of the valve.

If desired, more than two pulse selecting circuits may be used. For instance three such circuits having delay lines giving delay times of 3, 5 and 7 microseconds, namely a total delay of 15 microseconds, will give an output train with a recurrence period of 105 microseconds.

The disadvantage, that as the number of selecting circuits is increased the number of valves needed is increased, can be mitigated by using germanium triodes instead of thermionic valves.

The length of delay line needed may be halved at the expense of extra circuit complications by using open-circuited delay lines in which input and output are at the same end of the line.

The form of delay line described, embodying lumped impedances, may be replaced, perhaps with advantage, by a titanate, piezo-electric delay line or by a ferrite delay line.

I claim:

Apparatus for generating a train of recurrent pulses having a predetermined recurrence frequency and a phase determined by the time of occurrence of a trigger pulse, such apparatus comprising a source of clock pulses of recurrence frequency which is an integral multiple of the said predetermined recurrence frequency, a plurality of pulse selecting circuits each including a gate circuit, a time-delay device, means coupling the output of said gate circuit to the input of said time-delay device, and means coupling the output of said time-delay device to said gate circuit to apply delayed pulses to open said gate circuit, said time-delay devices having different time delays which are each equal to an integral multiple of the recurrence period of said clock pulses, but are each unequal to the recurrence period of said train of recurrent pulses, the lowest common multiple of the respective time delays being equal to the recurrence period of said train of recurrent pulses, means coupling said source of clock pulses to the inputs of all said gate circuits, means for applying said trigger pulse to open all said gate circuits simultaneously, a coincidence device generating a pulse in the output thereof only in response to pulses applied simultaneously to inputs thereof, and means coupling the outputs of said gate circuits respectively to said inputs of said coincidence device.

References Cited in the file of this patent

UNITED STATES PATENTS

| | | |
|---|---|---|
| 2,538,278 | Brown et al. | Jan. 16, 1951 |
| 2,602,140 | Fink | July 1, 1952 |
| 2,643,330 | Borgeson | June 23, 1953 |
| 2,688,077 | White et al. | Aug. 31, 1954 |